United States Patent
Guan

(10) Patent No.: US 6,741,784 B1
(45) Date of Patent: May 25, 2004

(54) OPTICAL FIBER CLAMPING APPARATUS TO HOLD FIBER CABLE WHILE PROVIDING RETRACTABLE DISTANCE ACROSS MODULE UNIT

(75) Inventor: William Z. Guan, Union City, CA (US)

(73) Assignee: Avanex Corporation, Fremont, CA (US)

( * ) Notice: Subject to any disclaimer, the term of this patent is extended or adjusted under 35 U.S.C. 154(b) by 48 days.

(21) Appl. No.: 09/888,301

(22) Filed: Jun. 22, 2001

(51) Int. Cl.$^7$ ................................................. G02B 6/00
(52) U.S. Cl. ........................................................ 385/135
(58) Field of Search ................................. 385/134–139; 439/942

(56) References Cited

U.S. PATENT DOCUMENTS

| | | | | |
|---|---|---|---|---|
| 5,446,822 A | * | 8/1995 | Keith | 385/135 |
| 5,513,295 A | * | 4/1996 | Go | 385/137 |
| 5,572,617 A | * | 11/1996 | Bernhardt et al. | 385/135 |
| 6,311,007 B1 | * | 10/2001 | Daoud | 385/135 |

* cited by examiner

Primary Examiner—Lynn Feild
Assistant Examiner—Son V. Nguyen
(74) Attorney, Agent, or Firm—Fernandez & Associates, LLP

(57) ABSTRACT

A fiber routing tray to hold, organize, and route fiber cables from external sources to other optical modules and optical components. The fiber routing tray mechanical device comprises a fiber entry block, fiber channel slot, retention bar with fiber clamps, fiber clamping slots, curved fiber routing fence, and a fiber exit opening. A retention bar with a contoured fiber retention clamps is used to hold fiber cables in place, provide a strain relief to a fiber cable, and distribute uniform clamping force on the fiber cable preventing insertion and return losses. Curved fiber channel slots with a preferable width help route fiber cables and prevent them from overbending. In addition, these fiber channel slots control the extension and retraction distance of the fiber cables during external fiber cable assembly. A curved fiber routing fence help route fiber cables and help prevent them from over-bending and tangling inside of the fiber reel tray. An exit opening allows fiber cables to drop below the fiber tray before the fiber cables are attached to the optical devices and optical modules.

9 Claims, 5 Drawing Sheets

OPTICAL FIBER CLAMPING APPARATUS TO HOLD FIBER CABLE WHILE PROVIDING RETRACTABLE DISTANCE ACROSS MODULE UNIT

FIELD OF INVENTION

The present invention relates generally to the field of optical devices, and particularly a fiber routing tray mounted on a PCB.

BACKGROUND OF INVENTION

In telecommunications equipment, optical modules and electronic circuits for signal monitoring, signal processing, temperature control, and motion control are typically assembled on a Printed Circuit Board (PCB) module which is then inserted into a modular network system. Depending on the requirement, specific fore-mentioned components are selected and assembled on a PCB for a particular application. A fiber routing tray mounted on a same PCB is utilized to help route incoming fiber cables to each of the optical modules, optical devices, and electronic circuitry on the PCB. The assembled PCB, also known as a daughter board, is inserted into a motherboard used in a telecommunication equipment.

The purpose of a fiber routing tray is to hold excess fiber cable length, provide a strain relief, and guide fiber cables onto other optical modules and optical devices mounted on the PCB. Inside the fiber tray, a retention clamp is used to hold a fiber cable in place to provide strain relief which prevents incoming fiber cables from being pulled out of position excessively. Conventional designs use a retention bar with a flat shaped clamp. Principle shortcomings of the flat shaped clamp include uneven clamping force of the fiber cables and excessive localized clamping pressure on the topside of the buffered fiber cable, which alters the fiber performance. The flat clamp creates non-uniform clamping pressure around a fiber cable especially on the topside, which results in insertion losses and return losses. Other prior art used epoxy to hold the fiber cable in place for the purpose of a strain relief, however the epoxy did not provide adequate clamping force to hold both the inner fiber cable, and the outer fiber jacket tubing in place. Since the fiber jacket tubing and fiber cable are loosely assembled together, the inner fiber cable can move even though the external fiber jacket tubing is weakly clamped by adhesive. Addition glue adhesive is used to increase clamping effectiveness resulting in messy manufacturing assembly. Repairing or repositioning fiber cables held in place with epoxy is also difficult. Accordingly, the present invention addresses these needs by using a retention bar with a fiber clamp that is contoured to the shape of the fiber cable, to distribute uniform clamping pressure all around the fiber cable. In addition to providing a strain relief, the fiber routing tray guides and route fiber cables onto other optical modules and optical devices mounted on the PCB. The fiber routing tray also provides protection for fusion splices, which connect external fiber cables with internal fiber cables inside the fiber routing tray.

SUMMARY OF INVENTION

The present invention discloses a fiber routing tray with an internal spool to hold excess fiber cable length, a fiber clamping slot to seat fiber cables for clamping, a retention bar with contoured fiber clamps to provide uniform and sufficient clamping force to a fiber cable for strain relief, a precision dimensioned curve slot to allow assembly slack for connecting fiber cables via fiber connectors, and a fiber entry block to provide adequate spacing of fiber cables and proper entry angles. Advantageously, the present invention significantly improves the clamping force to the fiber cable while reducing insertion and return losses.

Other structures and methods are disclosed in the detailed description below. This summary does not purport to define the invention. The invention is defined by the claims.

DETAILED DESCRIPTION OF PREFERRED EMBODIMENT(S)

Figure 1:
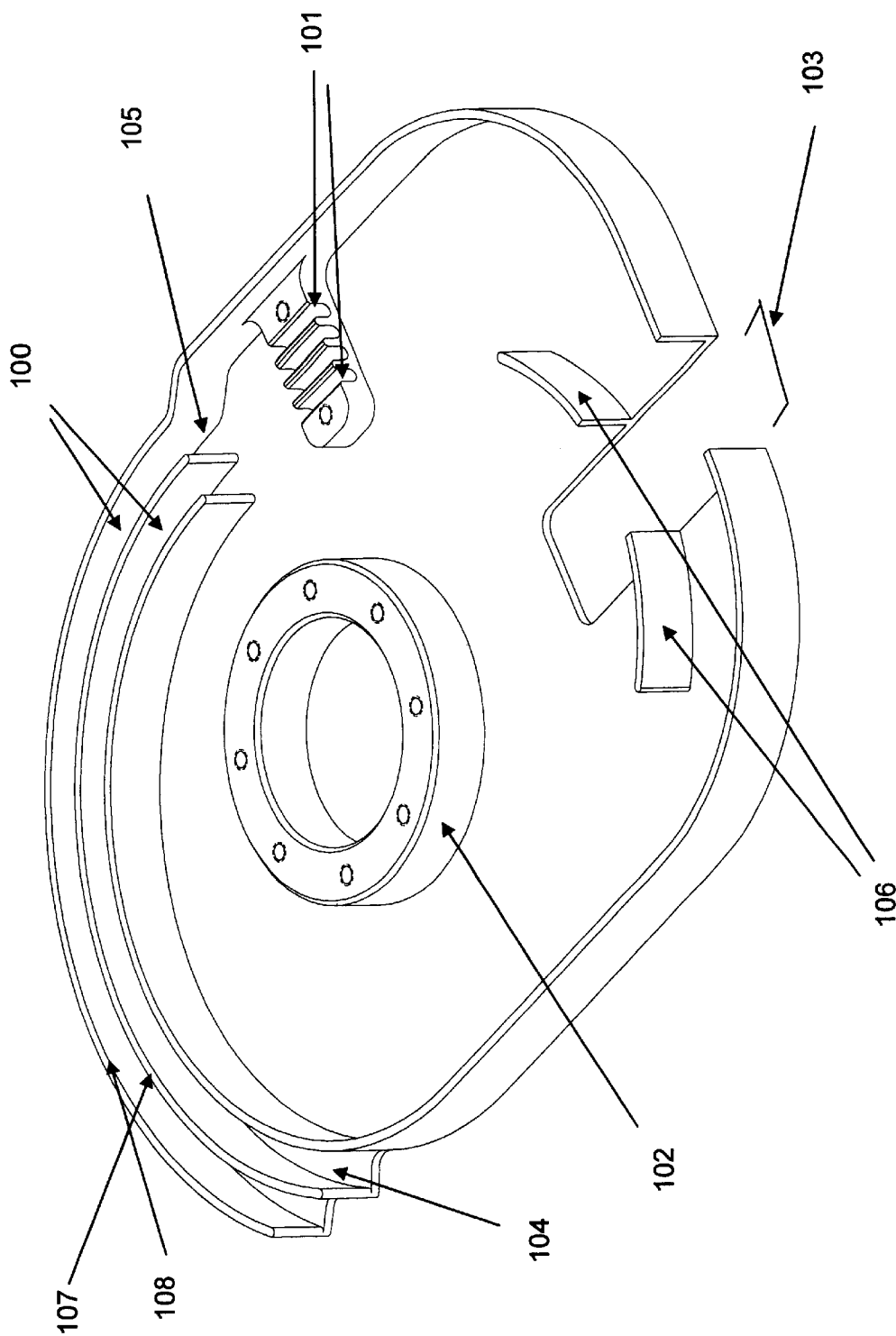
FIG. 1 is an illustration of a fiber reel routing tray in accordance with the present invention.

FIG. 1 is an illustration of a fiber reel routing tray depicting the location of fiber channel slots 100, fiber cable clamping slots 101, fiber cable spool 102, fiber routing fence 106, and fiber exit opening 103. During assembly, an external fiber cable passes through the fiber entry block passages 200 and follows the curved fiber channel routing slots 100 onto the fiber cable clamping slots 101 where the fiber cables are clamped and held into place with a contour retention clamp 300. The fiber cables then proceed around the outside fiber routing fence 106, which prevent the fiber cables from overbending and tangling inside the fiber tray. The fiber cable spool 102, which have mounting holes for attaching the fiber routing tray on to a PCB, also functions to route fiber cables. The fiber cables may be wrapped around the fiber cable spool 102 and fiber routing fence one or more times, and then eventually make its way onto the fiber tray opening 103 and onto other optical modules and optical components on the PCB.

The fiber channel slots 100 route incoming fiber cables to the fiber clamping slots 101 and prevent fiber cables from overbending. The preferable width of the fiber channel slots 100 are sized to allow some slack when fiber cables are pulled or pushed on when connecting the external fiber cable to other equipment by fiber connectors. The width of the curved fiber routing channels 100 provides a linear retractable distance across the fiber entry block passageway 200. The inner curved routing wall 107 of the fiber channel routing slot provides the maximum slack when fiber cable is pulled to be connected or join at an external connector interface. The outer curve routing wall 108 of the fiber channel routing slot 100 provides a guide stop to allow a fiber cable some slack to be retracted into the fiber routing tray after external fiber connector is interfaced. Slot width is a key to control the retractable distance for connector assembly.

Figure 2:
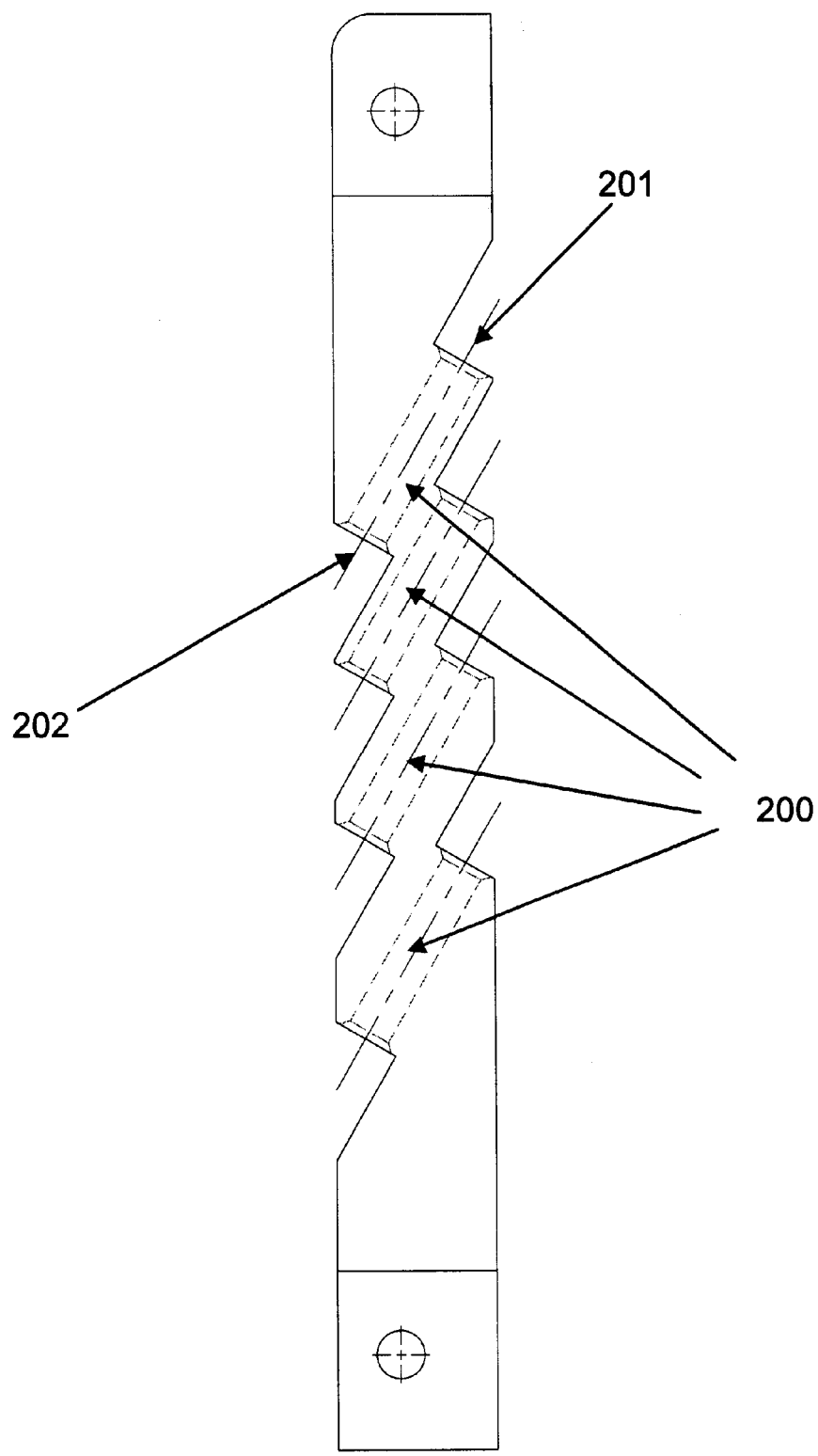
FIG. 2 is top view drawing of a fiber entry block in accordance with the present invention.

FIG. 2 is a top view drawing illustrating the fiber entry block and the location of the fiber cable pass-through holes 200. The fiber entry block controls the location of each fiber cable entering into the fiber tray. The fiber cable pass-through holes 200 guide the fiber cables into the entrance of the fiber tray 104. The slanted staggered configuration allows entering fiber cables to be routed as parallel to the PCB as possible at the entrance hole 202 of the fiber entry block. The entry guide passageway exit 201 helps direct fiber cables to the fiber routing tray entrance 104 at a precise entry angle tangent to the curved routing slot entrance 104. The slanted staggered configuration of the fiber cable passageways 200 prevents the fiber cables from straining, bending, and tangling. In addition, each fiber entry hole 202 and fiber entry passageway 200 is located at different elevations for improved spacing. The pass-through holes 200 allow some in-and-out linear movement of fiber cables, limited by the fiber channel 100 slot width so that proper slack is provided when joining external fiber cables at the fiber connector interface.

Figure 3:
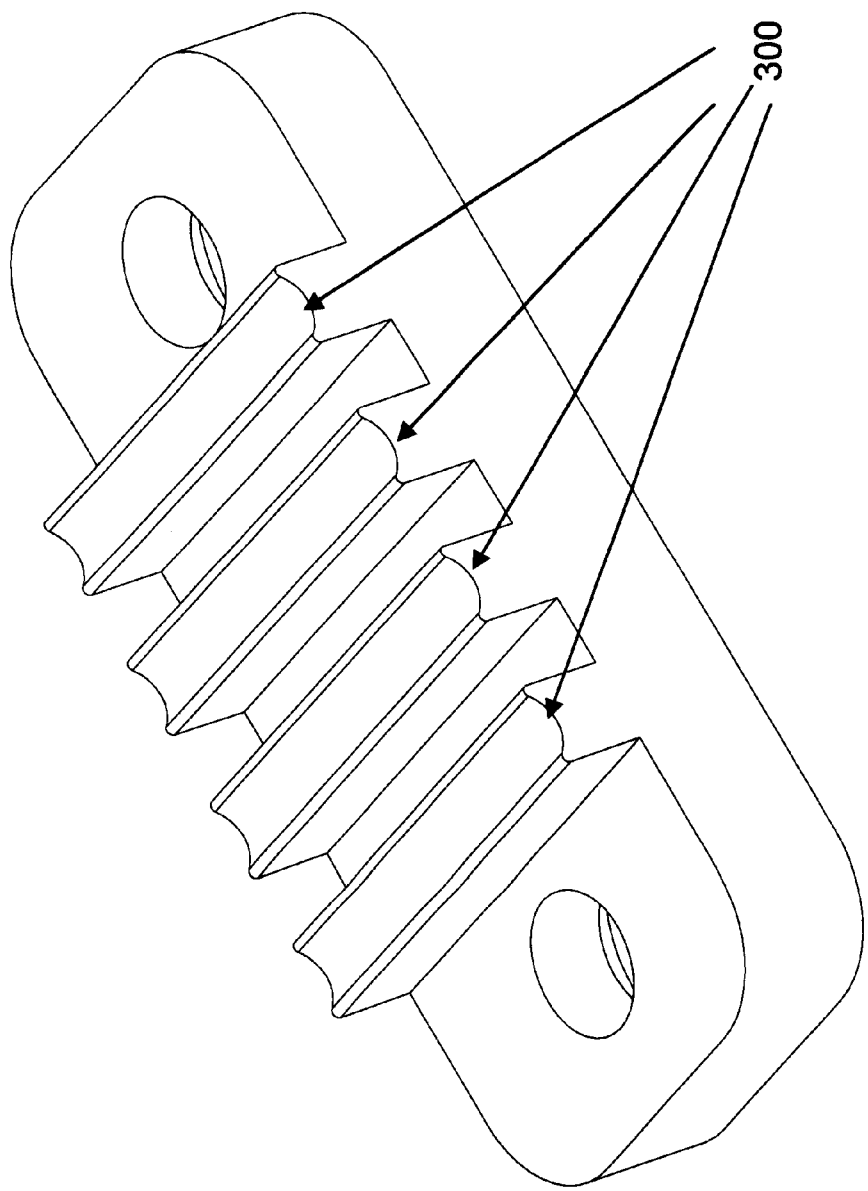
FIG. 3 is an illustration of a fiber retention-clamping bar in accordance with the present invention.

FIG. 3 is an illustration of the retention bar along with the contoured fiber cable clamps 300 extending from the retention bar. Screws are used to fasten the retention bar to hold the fiber cable into the fiber clamping slots 101 snuggly. In order to distribute uniform pressure while clamping, the curvature of the fiber cable clamps 300 is contoured to match the curvature of the fiber cables creating a uniform circular clamping pressure when the fiber cable is clamped in place.

Figure 4:
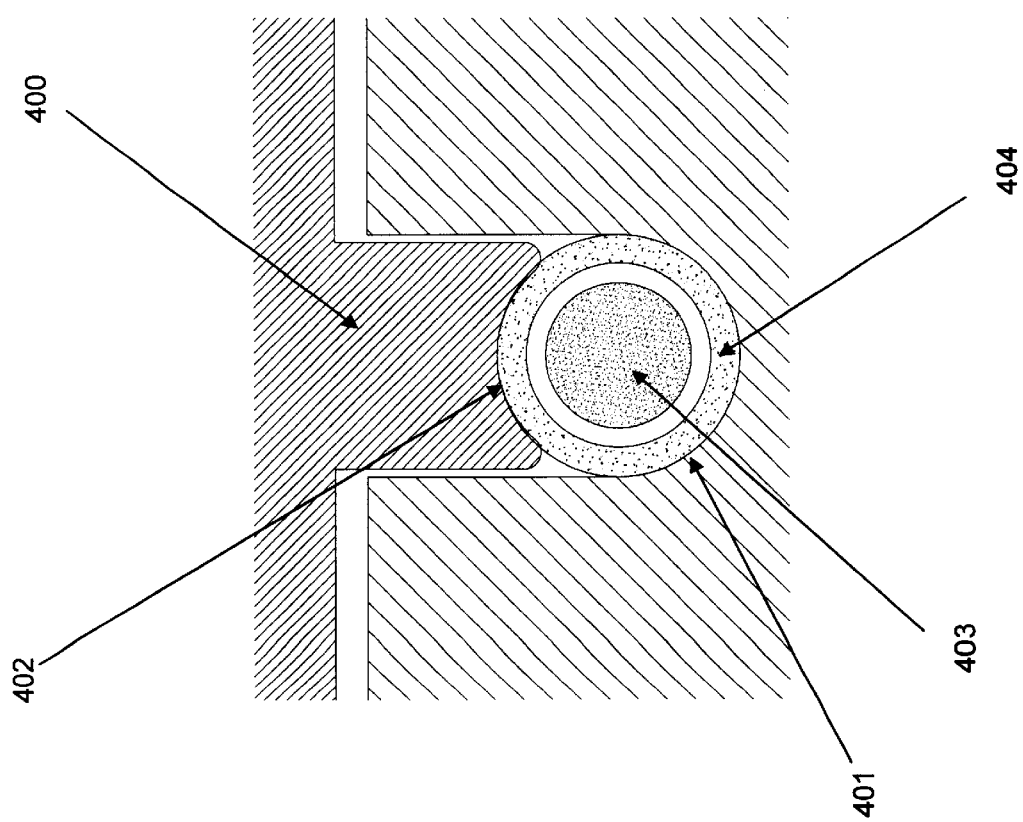
FIG. 4 is a cross-sectional view of a contoured fiber retention clamp along with a fiber cable clamping slot in accordance with the present invention.

FIG. 4 is a cross-sectional view of the contoured fiber clamp 402 along with a fiber cable clamping slot 401. A retention bar 400 with an extended curved contour fiber clamp 402, matching the outline of the fiber cable 403 with protective tubing 404, functions as a lid to clamp the fiber cable 403 with protective tubing 404 in place. The contoured clamp arch 402 conforms to the outside curve of the fiber cable tubing 404. The lower fiber clamping slot 401 also has a similar curvature as the fiber cable tubing 404 as well. The curved clamp arch 402 along with the curved fiber clamping slot 401 creates a circular hold on the fiber cable 403 and fiber cable tubing 404 by distributing even clamping pressure all around the fiber optic cable when secured in place. The uniform pressure prevents the fiber cables 403 from being pinched or pressed into distortion, which leads to insertion losses and return losses. When the fiber cables 403 are securely clamp in place, the clamped region acts as a strain relief to prevent any tension forces pulling outside the fiber entry block from tearing, tangling, and bending the fiber optic cables inside the fiber reel tray. In addition, fiber cables 403 are protected from being yanked and ripped from the fiber tray at more fragile interfaces such as fusion splices inside the fiber tray.

Figure 5:
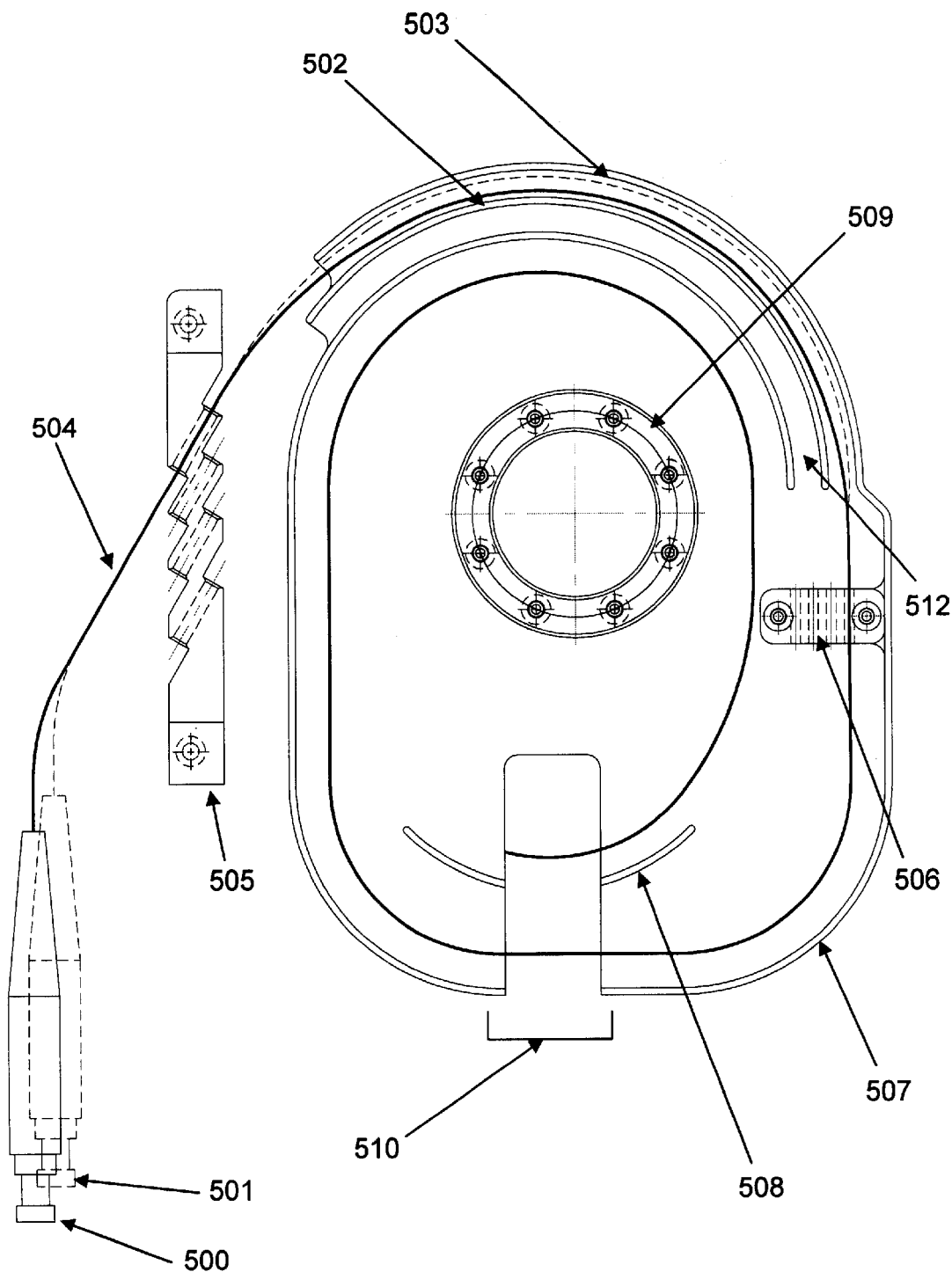
FIG. 5 is an illustration of the fiber tray with fiber cable assembly in accordance with the present invention.

FIG. 5 is an illustration of the fiber reel routing tray 507, fiber entry block 505, fiber cable 504, and retention bar with fiber clamps 506. The retention bar with fiber clamps 506 secures the fiber cable into the fiber clamping slots and prevents the fiber cable from moving at the clamped area. The width of the curved fiber channel routing slot 512 controls the travel distance an external fiber cable can travel. When a fiber connector 500 is in a first extended position 500, the inner fiber channel routing wall 502 limits the amount of travel the fiber cable 504 can be extended to. When the fiber connector 501 is in a second retracted position 501, the outer routing wall 503 limits the amount of retraction of the fiber cable 504. Inside the fiber reel routing tray 507, the fiber cable 504 is routed around the fiber routing fence 508, the routing spool 509, and onto the fiber tray exit 510.

Foregoing described embodiments of the invention are provided as illustrations and descriptions. They are not intended to limit the invention to precise form described. This fiber routing tray was depicted as being longitudinal in shape with fiber channel routing slots at one end. The location of the fiber channel routing slots may vary. The curvature and spacing of the fiber channel routing slots may vary in dimension. The location, size, and geometry of fiber routing fence and routing spool may be repositioned to accommodate different fiber cable size and different routing directions. One of ordinary skill in the art should recognize that the contoured fiber clamp and fiber clamping slot may vary in size, contour, and curvature. The fiber clamping location may be repositioned to optimize fiber routing. Accordingly, various modifications, adaptations, and combinations of various features of the described embodiments can be practiced without departing from the scope of the invention as set forth in the appended claims.

I claim:

1. An apparatus, comprising:
    a fiber routing tray having one or more deep fiber clamping slots, the fiber routing tray having a first outside routing wall and a first inside routing wall associated with a first fiber channel;
    a retention bar having a horizontal bar and one or more apertures formed therein, and one or more protruding fiber retention clamps, perpendicularly extended from the horizontal bar each retention clamp having a face with an arch contour for holding a fiber cable, the retention bar serving as a top side lid for placing over the one or more deep fiber clamping slots in the fiber routing tray, wherein each retention clamp corresponds and extends into each fiber clamping slot;
    one or more screws being inserted through the one or more apertures to fasten the retention bar for holding the fiber cable into the fiber clamping slots;
    a fiber entry block; and
    a first fiber connector for connecting to a first fiber cable, the first fiber cable passing through a first pass through hole in the fiber entry block for pulling or retracting the length of the first fiber cable away from the fiber entry block, the distance in the amount of pulling or retracting being dictated by the outside routing wall and the inside routing wall associated with the first fiber channel.

2. The apparatus of claim 1, wherein the fiber routing tray having a second outside routing wall and a second inside routing wall associated with a second fiber channel, further comprising a second fiber cable for passing through a second pass through hole in the fiber entry block for pulling or retracting the length of the fiber cable away from the fiber entry block, the distance in the amount of pulling or retracting being dictated by the second outside routing wall and the second inside routing wall associated with the second fiber channel.

3. The apparatus of claim 2, wherein the fiber entry block is used for organizing and separating the fiber cable from tangling.

4. The apparatus of claim 2, further comprising a fiber connector, the fiber cable attached to the fiber connector and extending through the fiber entry block and extending into the fiber routing tray, the fiber connector having a first position and a second position, the first position of the fiber connector for extending the fiber cable against the inner routing wall of one of the fiber channel slots, the second position of the fiber connector for retracting the fiber cable against the outer routing wall of one of the fiber channel slots.

5. The apparatus of claim 2, further comprising one or more fiber routing fence, the fiber cable extending from the fiber connector, through the fiber entry block, through the fiber channel slot, through the fiber clamping slot, and through the fiber routing fence.

6. The apparatus of claim 1, wherein the fiber retention clamp and the fiber clamping slots have a contoured clamp surface which distributes uniform clamping pressure around on the fiber cable to prevent insertion losses and return losses when holding the fiber cable in place.

7. The apparatus of claim 5, wherein the routing fence guides and routes the fiber cable along the inside of the fiber routing tray preventing fiber cables from tangling and overbending.

8. The apparatus of claim 2, wherein each of the first and second fiber channel slots having a width and radius that prevents incoming fiber cables from overbending.

9. The apparatus of claim 1, wherein the first inside routing wall provides a maximum slack when the first fiber cable is pulled to be connected at an external connector interface.

* * * * *